July 31, 1923.

E. BUGATTI 1,463,497

APPARATUS FOR THE INSERTION OF SCREW STUDS

Filed Aug. 25, 1921

Inventor
Ettore Bugatti
By [signature]
Atty

July 31, 1923.

E. BUGATTI 1,463,497

APPARATUS FOR THE INSERTION OF SCREW STUDS

Filed Aug. 25, 1921

Inventor
Ettore Bugatti
By [signature] atty

Patented July 31, 1923.

1,463,497

UNITED STATES PATENT OFFICE.

ETTORE BUGATTI, OF MOLSHEIM, FRANCE.

APPARATUS FOR THE INSERTION OF SCREW STUDS.

Application filed August 25, 1921. Serial No. 495,296.

(GRANTED UNDER THE PROVISIONS OF THE ACT OF MARCH 3, 1921, 41 STAT. L., 1313.)

*To all whom it may concern:*

Be it known that I, ETTORE BUGATTI, a subject of the King of Italy, residing at Molsheim, Bas-Rhin, France, have invented certain new and useful Improvements in Apparatus for the Insertion of Screw Studs (for which I have filed an application in France October 24, 1918, Patent No. 492,485); and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an apparatus for the mechanical insertion of screw studs, and is specially constructed for the purpose of obtaining a rapid insertion of the said studs as well as a suitable check upon the manufacture, the said apparatus having at the same time a simple and substantial character.

The said apparatus is so constructed as to refuse to act in the case of screw studs which are either too tight or too loose, and will only insert the same in pieces of work which have been properly drilled and tapped. To this effect, the actuating of the parts required for first screwing the stud in position is carried out by means of a braking ring device of adjustable character, and the subsequent final screwing is effected by the use of a set of balls movable upon ramps, the movement of the said balls acting to impel a driving piece against the end of the stud which is engaged in the apparatus. The initial driving of the said apparatus in either direction takes place by means of an elastic clutch device which is similar to the device employed for screw-cutting machines, which is so disposed as to prevent the further driving of the stud after the same has been completely screwed into the piece under operation. The release operation is readily effected by a rear movement, which acts to disengage the said balls, whereupon the stud may be unscrewed from the apparatus without effort.

The following description, together with the accompanying drawings which are given by way of example, sets forth a practical embodiment of this invention and a modified form of the same.

Figure 3:
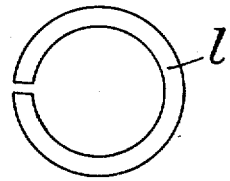
Figure 4:
Figure 5:
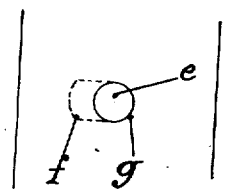
Figure 2:
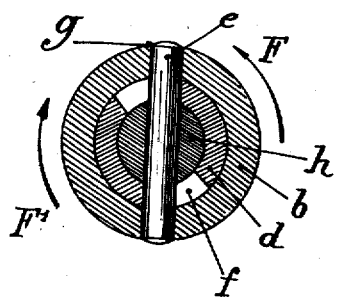
Fig. 2 is a horizontal section on the line 2—2 of Fig. 1.
Figure 1:
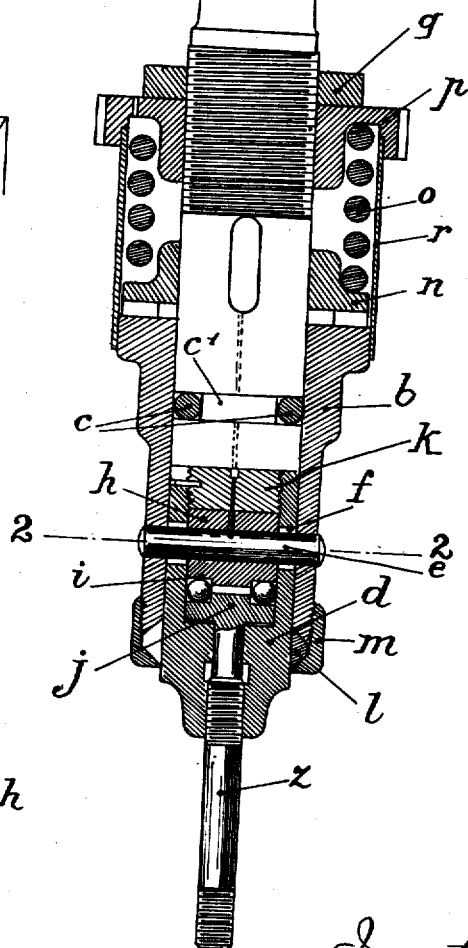
Fig. 1 represents the said apparatus in axial section, provided with the screw stud.

Figs. 3, 4 and 5 relate to details of construction of the apparatus shown in Figs. 1 and 2.

Figure 6:
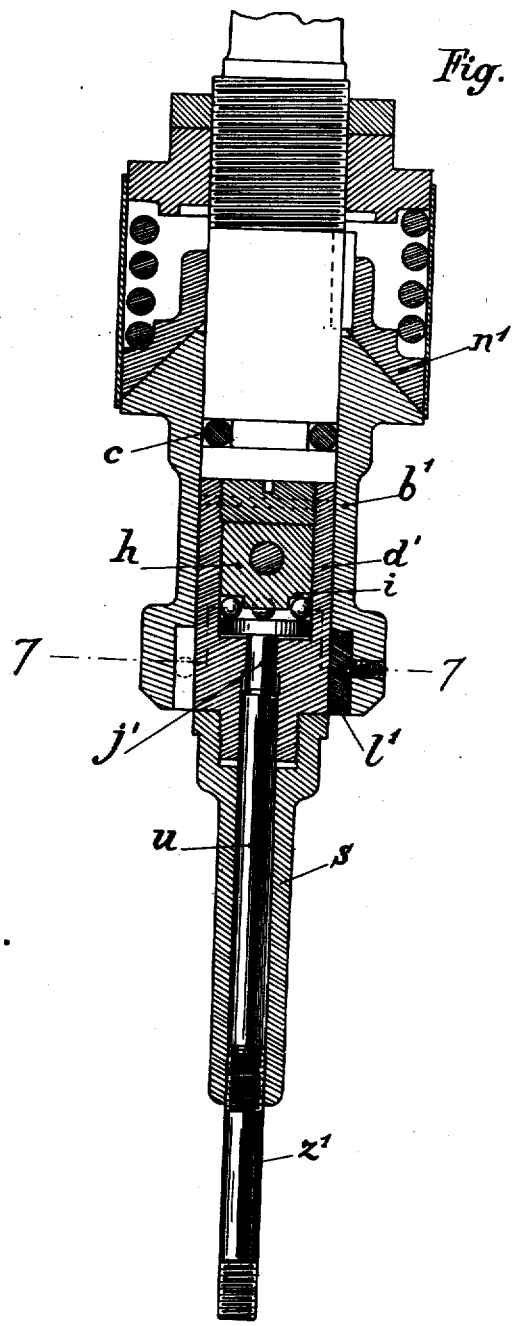

Fig. 6 is an axial section of the said modified form of the apparatus.

Figure 7:
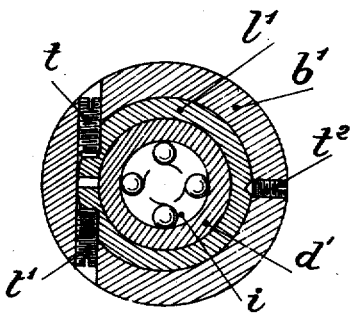

Fig. 7 is a horizontal section on the line 7—7 of Fig. 6.

Figure 8:

Fig. 8 shows a detail of construction which is common to both forms of the apparatus.

In the device shown in the first five figures, the driving shaft of the apparatus will be observed at $a$. The said shaft ends in the usual conical portion whereby it is readily mounted in a drilling machine with rapid return action or like machine tool. Upon the said shaft is loosely mounted the sleeve $b$ which is vertically maintained by two pins $c$ engaged in an annular groove $c^1$ formed in the shaft $a$. Within the circular sleeve $b$ and at the lower part thereof is disposed a socket $d$ which is adapted to carry the screw stud, and is actuated under certain conditions by the sleeve $b$. It should be observed that the said socket is enabled to effect a limited angular displacement relative to the sleeve $b$ by the suitable disposition of the cross pin $e$ which traverses the socket through the elongated apertures $f$ and is engaged at the ends in round apertures $g$ formed in the walls of the said sleeve. Fig. 2 shows in horizontal section and Fig. 5 in elevation, the manner in which this disposition is carried out. The cross pin $e$ is secured in a bearing member $h$ disposed within the socket $d$ and resting upon the end of the shaft $a$, by means of a plug $k$, preferably through the intermediary of a ball bearing. The lower surface of the bearing member is provided with the ball ramps $i$ resting upon the said balls, and the latter are caused to bear upon a disk $j$ which at the desired moment enters in contact with the stud to be screwed. The said stud is represented at $z$ and is screwed into the socket $d$.

The actuating device with adjustable power is constituted by a split ring $l$ of a double conical shape which is disposed within the lower part of the sleeve $b$ upon a bearing surface adapted for the purpose. A nut $m$ which is provided with a corresponding conical part, produces a tightening effect upon the said ring, according as the nut is more or less screwed upon the screwthread of the sleeve $b$, thus adjusting the effect produced by the split ring $l$. A view of the said ring in horizontal projection is shown in Fig. 3. The sleeve $b$ is actuated in either direction by means of an elastic clutch device similar to what is employed for screw cutting machines. Fig. 1 shows the jaw plate $n$ of such device which is pressed by a spring $o$ upon corresponding jaws in the upper part of the sleeve $b$. The action of this device may be regulated with great precision by the nut $p$ which serves as a seat for the spring and is disposed in the desired position, wherein it is held fixed by a lock nut $q$. The whole of the clutch device as well as the remainder of the apparatus is protected from dust by a suitable casing $r$.

The operation of the apparatus is as follows. To insert the screw stud $z$, one first screws the same into the standard screwthread of the socket $d$ and then places the apparatus above the piece of work; the machine used for the normal drive of the whole device is fitted upon the conical part of shaft $a$; the lower screw-threaded end of the screw stud is then screwed into the piece of work, at the same time that it becomes completely screwed into the socket $d$, since the two screwthreads at the ends of the stud have the same sense. When the apparatus is rotating in the direction of the arrow $F'$, the various elements occupy the position shown in section in Fig. 2. The sleeve $b$ which is driven by shaft $a$ will act through the medium of the brake or split ring $l$ upon the socket $d$, and the adhesion of the brake $l$ will suffice for the drive. At this time the cross pin $e$ is situated with respect to the socket $d$ as is shown in Fig. 2, i. e., the bearing member $h$ secured to the cross pin $e$ occupies a position such that the balls are loose in their space between the bearing member $h$ and the disk $j$.

When the resistance due to the screw stud $z$ increases during the screwing operation, the split ring $l$ will no longer suffice for the drive, and the sleeve $b$ will now slip upon the socket $d$ which remains stationary. At this time, as shown in Fig. 2, the cross pin $e$ moves in the sense of the arrow F in the elongated holes $f$ and it effects the rotation of the bearing member $h$ with respect to the socket $d$. The balls now engage the ramps $i$ and impel the disk $j$ upon the end of the screw stud $z$, thereby forcing the latter into its seat while at the same time the screw stud continues to rotate since a rigid connection is again afforded between the screw stud and the sleeve $b$ by reason of the resistance of the balls. The screw stud is thus driven tightly in place, until the resistance becomes too great for the driving capacity of the elastic coupling comprising the spring $o$.

The apparatus is disengaged with great facility. The shaft $a$ is rotated in the contrary sense, and the sleeve $b$ will at once release the cross pin $e$, as shown in Fig. 2, referring to the direction of rotation according to the arrow F. When the cross pin $e$ is released, the bearing member $h$ will no longer exert a pressure upon the said balls and these will return to the end of the ball ramps $i$, and the disk $j$ will cease to bear upon the end of the stud. The stud $z$ will now be tightly screwed at the lower part and loosely screwed at the upper part situated within the said socket; it will therefore leave the latter member with facility and will remain secured in the piece under operation.

As above mentioned, the apparatus may also be used in order to exercise a checking operation upon the manufacture, this being carried out as follows. Should the stud be too small—or the piece of work too large—the stud will not become fixed in the piece, since the braking member $l$ will suffice for the driving action throughout the whole operation; in consequence, the stud will become unscrewed as soon as the tool returns to the rear. On the contrary, should the stud be too large—or the piece of work too small—the stud will become blocked too soon in the socket and before being completely screwed in place, and the operator will thus observe that the stud has not been properly inserted. This apparatus affords a screwing action with constant effort for all studs of the same type, this result not having been obtained in the known devices. It is evident that it will be necessary to provide different tools according to the size of the studs, but the use of the braking member $l$ will afford a considerable range of action, by means of a suitable adjustment.

For operations requiring the use of studs of some length, or in cases where the screwing operation is carried out in places which are difficult of access, a longer socket is employed, as represented at $s$ in the modified form of construction shown in Fig. 6. This device presents other differences in the details of construction, but it is obvious that the principle remains the same. Instead of using a jaw clutch device, the device shown in Fig. 6 makes use of a cone clutch comprising the disk $n^1$ and the upper end of the sleeve $b^1$ having a corresponding shape. The braking member for actuating the socket $d^1$ as used in the preceding case is now slightly modified.

It will be observed in Figs. 6 and 7 that the ring $l^1$ has a cylindrical form, and that it is tightened by means of two tangent screws $t$, $t^1$ tending to bring together the split portion to a greater or less degree. As in the former case, a very exact adjustment may be thus obtained. The device is here completed by the use of a third screw $t^2$ which is situated diametrically opposite the slot for the purpose of securing the ring $l^1$ concurrently with the other two screws.

The socket has also been represented in Fig. 6. It is provided with an auxiliary socket $s$ screwed to the lower part thereof. The disk $j'$ is here shown as acting upon the stud $z^1$ through an intermediate member $u$. It is however obvious that the said details are altogether of a secondary nature and that they may be modified within very wide limits without departing from the spirit of my invention. Fig. 8 represents one form of the ramps formed upon one of the surfaces in contact with the set of balls of the bearing member $h$.

Having now described my said invention, and the best means I know of carrying the same into effect, I claim:

1. An apparatus for the insertion of screw studs comprising a shaft, a sleeve surrounding the same, an elastic coupling device for actuating said sleeve, a socket wherein the screw stud is disposed, elastic means connecting the socket and sleeve under normal resistance, automatic means provided for the rotation of said socket with respect to said sleeve when the resistance exceeds the normal, and for the tight insertion of the screw stud into the piece of work at the end of the stroke.

2. An apparatus for the insertion of screw studs, comprising a shaft, a sleeve surrounding the same, an adjustable elastic coupling device for actuating said sleeve, a socket wherein the screw stud is disposed, an elastic split ring surrounding said socket, a nut screwed upon the lower part of said sleeve for fitting the ring upon the latter, whereby a connection is obtained between the socket and sleeve for the drive of said socket under normal resistance, automatic means provided for the rotation of said socket with respect to said sleeve when the resistance exceeds the normal and for the tight insertion of the screw stud into the piece of work at the end of the stroke.

3. An apparatus for the insertion of screw studs, comprising a shaft, a sleeve surrounding the same, an adjustable elastic coupling device for actuating said sleeve, a socket wherein the screw stud is disposed, an elastic split ring surrounding said socket, a nut screwed upon the lower part of said sleeve for fitting the ring upon the latter, whereby a connection is obtained between the socket and sleeve for the drive of said socket under normal resistance, a bearing member disposed within said sleeve, a cross pin secured to said bearing member and adapted to traverse elongated holes in said socket and to thus engage the sleeve, whereby an angular displacement of the socket with respect to the sleeve is obtained, and means for bearing upon the screw stud during said angular displacement.

4. An apparatus for the insertion of screw studs, comprising a shaft, a sleeve surrounding the same, an adjustable elastic coupling device for actuating said sleeve, a socket wherein the screw stud is disposed, an elastic split ring surrounding said socket, a nut screwed upon the lower part of said sleeve for fitting the ring upon the latter, whereby a connection is obtained between the socket and sleeve for the drive of said socket in conditions of normal resistance, a bearing member disposed within said sleeve, a cross pin secured to said bearing member and adapted to traverse elongated holes in said socket and to thus engage the sleeve, whereby an angular displacement of the socket with respect to the sleeve is obtained, a disk disposed within said socket and adapted to bear upon the sleeve, balls interposed between the bearing member and disk, and ramps formed upon the lower face of said bearing member, whereby said disk is caused to bear upon the screw stud during the angular displacement of said socket with respect to said sleeve.

In testimony whereof I have signed this specification.

ETTORE BUGATTI.